United States Patent
VanBlon et al.

(10) Patent No.: US 10,573,171 B2
(45) Date of Patent: Feb. 25, 2020

(54) METHOD OF ASSOCIATING USER INPUT WITH A DEVICE

(71) Applicant: Lenovo (Singapore) Pte. Ltd., Singapore (SG)

(72) Inventors: Russell Speight VanBlon, Raleigh, NC (US); Nathan J. Peterson, Oxford, NC (US); John Carl Mese, Cary, NC (US); Arnold S. Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/602,529

(22) Filed: May 23, 2017

(65) Prior Publication Data

US 2018/0342151 A1 Nov. 29, 2018

(51) Int. Cl.
*G08C 17/02* (2006.01)
*G06F 3/16* (2006.01)
*G06F 3/01* (2006.01)
*G06K 9/00* (2006.01)

(52) U.S. Cl.
CPC ............ *G08C 17/02* (2013.01); *G06F 3/017* (2013.01); *G06F 3/167* (2013.01); *G06K 9/00006* (2013.01); *G06K 9/00288* (2013.01); *G06K 9/00355* (2013.01)

(58) Field of Classification Search
CPC .... G08C 17/00; G08C 17/02; G08C 2201/00; G08C 2201/50
See application file for complete search history.

(56) References Cited

U.S. PATENT DOCUMENTS

| | | | |
|---|---|---|---|
| 8,819,812 B1* | 8/2014 | Weber | G06F 3/017 726/18 |
| 9,348,985 B2* | 5/2016 | Davis | G06F 21/316 |
| 9,596,084 B2* | 3/2017 | Papakipos | G06F 1/1686 |
| 9,639,888 B2* | 5/2017 | Proulx | G06Q 30/0641 |
| 9,652,663 B2* | 5/2017 | Lau | G06K 9/00268 |
| 9,875,591 B2* | 1/2018 | Watters | G07C 9/00309 |
| 9,940,828 B2* | 4/2018 | Hou | G08C 17/02 |
| 9,942,854 B2* | 4/2018 | Kapoor | H04W 52/0264 |
| 2007/0073870 A1 | 3/2007 | Park et al. | |
| 2008/0034217 A1* | 2/2008 | McQuaide | H04B 1/202 713/186 |

(Continued)

FOREIGN PATENT DOCUMENTS

| | | |
|---|---|---|
| EP | 2930715 A1 | 10/2015 |
| JP | 2002091491 A | 3/2002 |

(Continued)

OTHER PUBLICATIONS

"European Application Serial No. 18172492.3, Search Report dated Jan. 11, 2019", 6 pgs.

(Continued)

*Primary Examiner* — Carlos Garcia
(74) *Attorney, Agent, or Firm* — Schwegman Lundberg & Woessner, P.A.

(57) ABSTRACT

A method includes determining a status of a first device, receiving a first user input, and associating the first user input with the first device, wherein the first user input and the status of the first device is used to associate the first user input with the first device.

18 Claims, 4 Drawing Sheets

(56) References Cited

U.S. PATENT DOCUMENTS

| | | | | |
|---|---|---|---|---|
| 2011/0307708 | A1* | 12/2011 | Kritt | G06F 21/74 |
| | | | | 713/183 |
| 2012/0303476 | A1* | 11/2012 | Krzyzanowski | G06F 8/60 |
| | | | | 705/26.5 |
| 2013/0015946 | A1* | 1/2013 | Lau | G07C 9/00 |
| | | | | 340/5.2 |
| 2014/0129006 | A1* | 5/2014 | Chen | G05B 15/02 |
| | | | | 700/90 |
| 2014/0371942 | A1* | 12/2014 | Matsuyama | H02J 3/14 |
| | | | | 700/297 |
| 2015/0061842 | A1* | 3/2015 | Yoon | G04G 21/04 |
| | | | | 340/12.5 |
| 2015/0120151 | A1* | 4/2015 | Akay | B60R 25/24 |
| | | | | 701/49 |
| 2015/0128219 | A1* | 5/2015 | Guday | H04L 63/08 |
| | | | | 726/4 |
| 2015/0257004 | A1* | 9/2015 | Shanmugam | H04W 12/06 |
| | | | | 455/411 |
| 2015/0363745 | A1* | 12/2015 | Hatch | G06Q 10/1091 |
| | | | | 705/32 |
| 2016/0071194 | A1* | 3/2016 | Proulx | G06Q 30/0641 |
| | | | | 705/26.8 |
| 2016/0127486 | A1* | 5/2016 | Chen | H04W 4/029 |
| | | | | 709/206 |
| 2016/0147987 | A1* | 5/2016 | Jang | G06F 21/32 |
| | | | | 726/19 |
| 2016/0157090 | A1* | 6/2016 | Huang | H04L 12/4625 |
| | | | | 370/329 |
| 2016/0231724 | A1* | 8/2016 | Bauer | G05B 19/0428 |
| 2016/0275281 | A1* | 9/2016 | Ranjit | G06F 21/32 |
| 2016/0330191 | A1* | 11/2016 | Watanabe | H04L 63/083 |
| 2016/0357163 | A1* | 12/2016 | Marti | G05B 15/02 |
| 2016/0359325 | A1* | 12/2016 | Kawata | H02J 3/14 |
| 2016/0360488 | A1* | 12/2016 | Kapoor | H04W 52/0264 |
| 2016/0373269 | A1 | 12/2016 | Okubo et al. | |
| 2017/0006089 | A1* | 1/2017 | Felteau | H04L 67/1004 |
| 2017/0025124 | A1 | 1/2017 | Mixter et al. | |
| 2017/0083312 | A1* | 3/2017 | Pindado | H04W 4/70 |
| 2017/0090864 | A1 | 3/2017 | Jorgovanovic | |
| 2018/0184286 | A1* | 6/2018 | Patterson | H04W 12/02 |

FOREIGN PATENT DOCUMENTS

| | | |
|---|---|---|
| JP | 2009210956 A | 9/2009 |
| KR | 1020120084021 A | 7/2012 |
| WO | WO-2014153342 A2 | 9/2014 |
| WO | WO-2014185808 A1 | 11/2014 |
| WO | WO-2015183401 A1 | 12/2015 |

OTHER PUBLICATIONS

"Printer load balancing", PaperCut Software International, [Online], Retrieved from the Internet: <URL: https://www.papercut.com/support/resources/manuals/ng-mf/applicationserver/topics/find-me-load-balancing.html>, (Accessed Oct. 29, 2018), 5 pgs.

"United Kingdom Application Serial No. GB1807885.7, Combined Search Report and Examination Report dated Oct. 31, 2018", 9 pgs.

* cited by examiner

METHOD OF ASSOCIATING USER INPUT WITH A DEVICE

BACKGROUND

Devices can receive input from a user in a variety of ways. User input may command a device to begin or stop an operation, or operate in a particular manner. A dishwasher for example may include start and stop buttons as well as buttons that control parameters such as type of operation (e.g., quick wash, normal wash, or drain) or optional features (e.g., heated dry). A microwave may include start and stop as well as timing input (e.g. 1 minute) and power level or food type (e.g. popcorn).

SUMMARY

A method may include determining a status of a first device, receiving a first user input, and associating the first user input with the first device, wherein the first user input and the status of the first device is used to associate the first user input with the first device.

A computing device may include a processor, and a memory device coupled to the processor having instructions stored thereon executable by the processor to determine a status of a first device, receive a first user input, and associate the first user input with the first device, wherein the first user input and the status of the first device is used to associate the first user input with the first device.

A machine readable storage device, that is not a transitory signal, may have instructions that are executable by a processor to perform operations including determining a status of a first device, receiving a first user input, and associating the first user input with the first device, wherein the first user input and the status of the first device is used to associate the first user input with the first device.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, AMC, microprocessor, or other type of processor operating on a computer system, such as a personal computer, server or other computer system. The article "a" or "an" means "one or more" unless explicitly limited to a single one.

User input to a device can be received through a variety of techniques, such as an audio input that receives voice command or other input from a user, or a gesture that may be detected by a sensor and interpreted by a processor. A device having a microphone input and a processor may perform voice recognition operations to process voice input and determine an instruction from the input. For example, a voice input to "stop," "start," or "pause" may be interpreted and communicated to a controller to execute the appropriate action. A gesture may be detected by a camera or other sensor and interpreted by a processor. Voice or gesture commands may be interpreted, for example, by reference to a lookup table and the application of logic that interprets a likely operation associated with the input.

In an environment where more than one device is present, it may be necessary to determine which device is the relevant recipient of a received input, especially where more than one device is a "smart device" that can process audio or gesture input or receive commands through a wired or wireless connection, and where the input does not explicitly identify a device for which it is intended. For example, in a kitchen environment, a microwave, dishwasher, and faucet may all be possible recipients of a command to "stop," and it may be unclear which device is supposed to execute a verbal command to stop.

To address this problem, user input may be processed in conjunction with contextual information to associate user input with a particular device. For example, device status may be used to provide context for the interpretation of user input. In one example, in the situation where a user provides a voice command that does not identify the intended recipient device, a device recipient may be determined from the present or recent position (e.g. proximity) or orientation of the user and interactions with the one or more devices, or other status information about the device. In response to determining that a received input is relevant to a particular device, that device may be associated with the received input.

To determine which device should be associated with a user input, the input from a user and device status data may, for example, be processed using an algorithm, in combination with information about the devices or user inputs (e.g. vocabulary or executable user commands), which may be obtained from a look-up table. In some examples, each device may each have a copy of its own lookup table. In another example, a hub, may have a saved copy of the lookup table for each device (specific to the device, or the type of device, e.g. a "toasters" table), or a "universal" table that may be used for multiple devices, or access to such tables via a network (e.g., the internet), and the hub device may consult the lookup table (or tables) to assess relevance.

In another example, one of the devices may operate as a "master" device, and may have a copy of a lookup table for each of the devices in the system, or may have access through a network (e.g., the internet) to a remote copy of a lookup table for each device or access to a "universal" lookup table. In a "hybrid" example, each device may consult its lookup table to assess the potential relevance of a received input, and the devices may pass retrieved or processed information (e.g. a score, as described below) to the hub or master device for further processing or compare the results produced by each device. In some examples, example, a lookup table may also include weights, confidence levels, or another metric that quantifies the likelihood that a particular input has relevance to a particular device.

Contextual information such as device status may be used to determine which device to associate with a received user input. The device status may include, for example, the proximity or orientation of a user relative to the device, a recent interaction with one or more devices, recent commands or other input to a device, or a sequence of commands. In some examples, device status information may be combined with lookup table information to determine a device association for a user input.

In some examples, a device may be associated with a user input responsive to determining that one or more association criteria is satisfied. The association criteria may, for example, include an association threshold, where the association criteria is satisfied when a confidence score for a device meets or exceeds an association threshold. A confidence score is a computed metric that indicates an association between a user input and a device. A confidence score may be computed, for example, based information from on a lookup table, with optional weights for various commands, recent commands or other recent input to a device, a prior sequence of commands, recent interactions with one or more devices, user location or orientation, or any combination thereof. In an example, a central device (e.g. a hub or "master" device in a system) may generate a confidence score for each device, and compare the scores to each-other or a threshold or both to determine which device to associate with user input, as further described in detail below. In another example, individual devices in a system may compute their own confidence score, and communicate the confidence score to a hub, to a master device, or to other devices in the system. In some examples, a hub or master device may compare the confidence scores, optionally apply weights or a priority scheme (described below), and declare a device that is to be associated with the user input. In one example, a score may be generated by each device and reported to a hub (or a specified "master" device), which may apply additional information, such as user location or orientation, or recent device interaction information, to generate a confidence score for each device.

In some examples, the association criteria may include a relative ranking. For example, a confidence score may be determined for each of a plurality of devices and a device with the highest confidence score may be associated with the input. In some examples, a device may be associated with an input if it has the highest ranked confidence score amongst a group of devices, and the confidence score exceeds a threshold. In some examples, a device may be associated with an input if the device has a confidence score in a specified zone or range or above a specified threshold, and the device also has a higher priority ranking than other devices having scores above the threshold or in the specified zone or range.

In some examples, weights may be associated with types of input from a user, or types of sensed interactions with a device, or user conditions (e.g. user position and orientation or direction of speaking/gaze). In some examples, a weight or priority may be assigned to a device, e.g. a stove may be assigned a higher weight or priority than a dishwasher, for example due to potentially higher urgency associated with a stove (e.g. turn off [the burner]). In various examples, a device priority may be predetermined, or determined from an algorithm, or a combination thereof. In some examples, an intermediate scores for an input/device combination may be multiplied by respective weights, and the resulting products for a device may be combined (e.g., summed) to generate an aggregate confidence score for a particular device relevant to a particular input. In some examples, priorities assigned to devices may be used to resolve conflicts, e.g. when two devices have the same confidence score, or confidence scores that are both within a specified range or zone, or within a specified amount (e.g. percentage) of each other. In some examples, when two devices have scores within a specified zone or range or amount (e.g. percentage), the input may be associated with the device that has a higher assigned priority. In some examples, each device in a system may have a specified priority score or number. In some examples, priority assignments may be accomplished by weights (e.g. stove weighted to have higher scores than the dishwasher, given equal input factors) or differential thresholds (e.g., the threshold for associating the stove with a command may be lower than the threshold for associating a dishwasher with the same command.)

In response to a determination being made to associate a user input with a device, an instruction may be communicated to the device associated with the input to execute an operation related to the user input. The instruction may be communicated within a device or system, e.g. from a processor that interprets input to a controller that actuates a response, or an instruction may be communicated in a system, e.g. the hub or master device may route the user input to the device that is associated with the user input.

Processing of user input and contextual information (e.g. device status) may be performed by a hub, or by a designated "master" device, or distributed amongst a group of devices, or by a remote device (e.g. internet server or other networked resource), or any combination thereof. In an example process, multiple smart devices may work together to each process user input and declare ownership, or lack thereof, to resolve which device should act in response to the user input. For example, devices that receive a user input may process the user input and contextual information to which they have access and declare a confidence score, and scores may be compared or further procesed as described above. In some examples, individual devices reference their own contextual information, such as recent interaction or a sequence of instructions or detected proximity or orientation of a user. In other examples, device may share contextual information or user location or proximity information with other devices in the system for use in processing device confidence scores for a user input. In an example, the confidence scores for each device may be communicated and compared by each device to determine whether a particular device has the highest score (e.g. the microwave will execute a command if its score for the command is higher than the score received from other devices). In another example, the score comparison may be arbitrated by a "master" device or hub that compares scores, and optionally considers priority information, and determines which device will be associated with the user input (e.g. a hub determines that a command will be associated with a dishwasher, informs the dishwasher that the command is associated with the dishwasher, and optionally informs the other devices that they should not execute the command.)

In another example, a hub, or specified "master" device, may arbitrate user input by directly receiving user input, or receiving forwarded input or other sensed information from smart devices, and determining which device is the likely appropriate recipient of user input or will otherwise be associated with the user input. In some examples, the hub may receive input in response to a wakeup word that activates a listening operation on the hub. In another example, one of a group of smart devices (e.g. a device deemed the "master" or operating as a hub) may arbitrate user input.

In another example, devices in a system may sequentially determine confidence scores. A first device may processes input to determine whether the input is relevant to a current operational state of the first device, and the first device may claim the user input responsive to determining that the user input is likely relevant to the operation of the first device. The first device may take ownership of the user input by sending a communication to a second device, such as a notification that the user input has been claimed, or an instruction to refrain from taking action responsive to the user input. The first device may also decline ownership of the user input and pass the user input on to a second device, which repeats the process described above and declares ownership or passes responsibility for the input on to a third device. In some examples, user profiles can be used. For example, a particular set of weights or priorities may be associated with a user (e.g. Dad uses the dishwasher, Mom tends to make coffee). A user profile may be determined, for example, based on voice recognition techniques, or face recognition using information obtained from a camera, or a grip on a remote or other device, or a fingerprint or other biometric, or a code entered on a device or delivered via voice input, or any combination thereof. In some examples, a user profile determination may be verified by entry of a code (e.g. a pin) on a remote or on a device, or from biometric information, or by oral confirmation (e.g., a "Greetings Dad" announcement from a device or hub followed by "Yes this is Dad" confirmation, or confirmation is assumed from absence of a correction)). In some examples, the user profiles may be adaptive based on patterns of user activity. In some examples, a profile determination may be made prior to determination of an association of a user input with a device.

In some examples, a system, device, or method may be adaptive, e.g. it may change one or more association parameters in response to a determination that a user input was incorrectly associated with a device, which may increase the accuracy of association of user input with devices.

Figure 1:
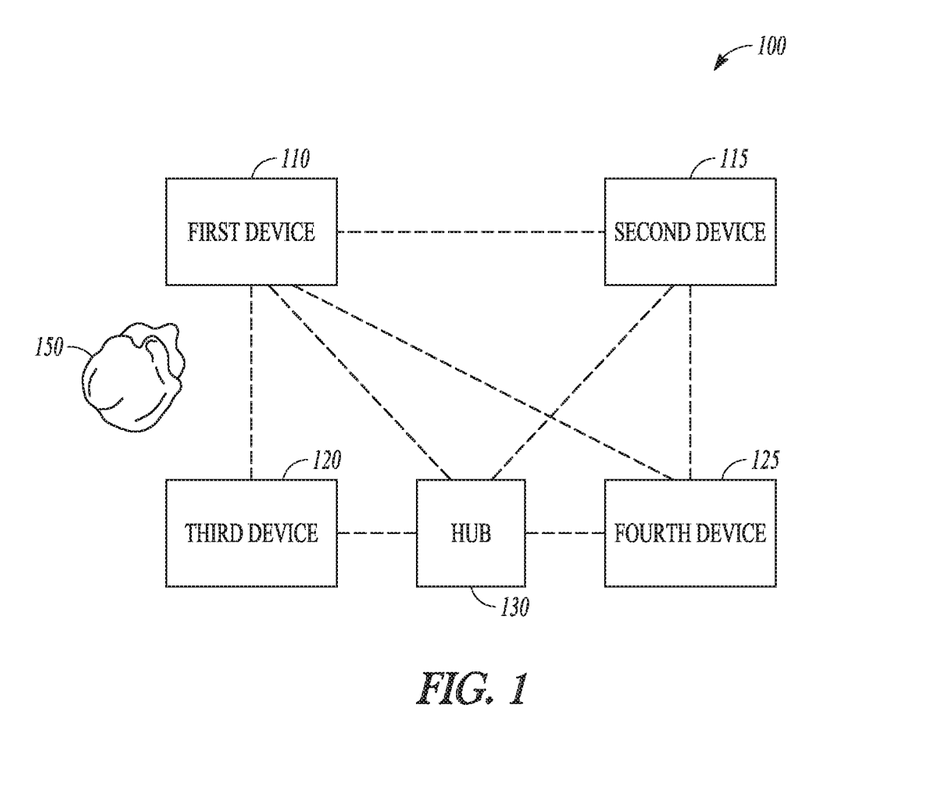
FIG. 1 is a block diagram of a system for associating user input with a device according to an example embodiment.
Figure 2:
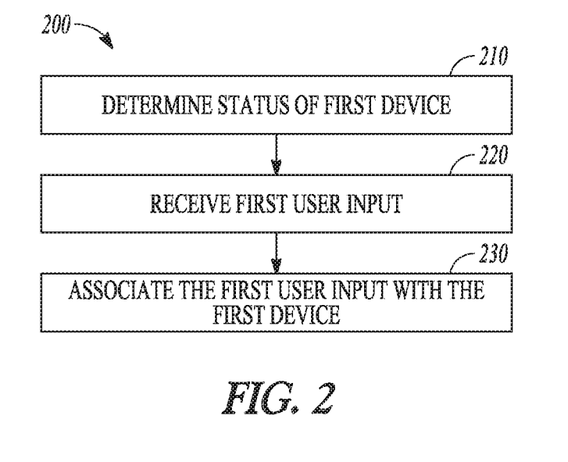
FIG. 2 is a flowchart illustrating a method of associating user input with a device according to an example embodiment.
Figure 3:
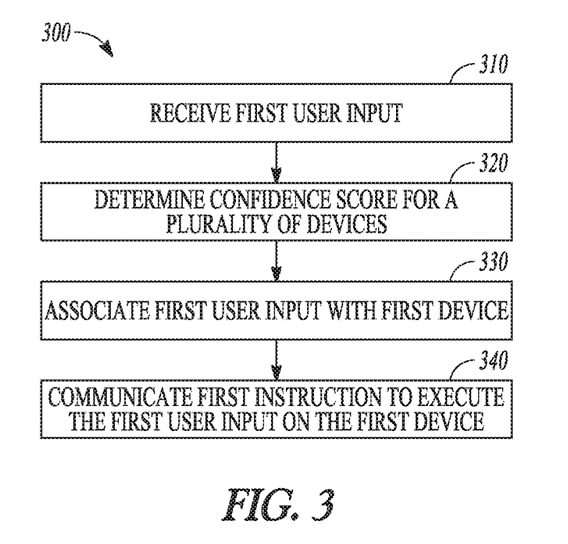
FIG. 3 is a flowchart illustrating a method 300 of associating user input with a device based on a confidence score according to an example embodiment.
Figure 4:
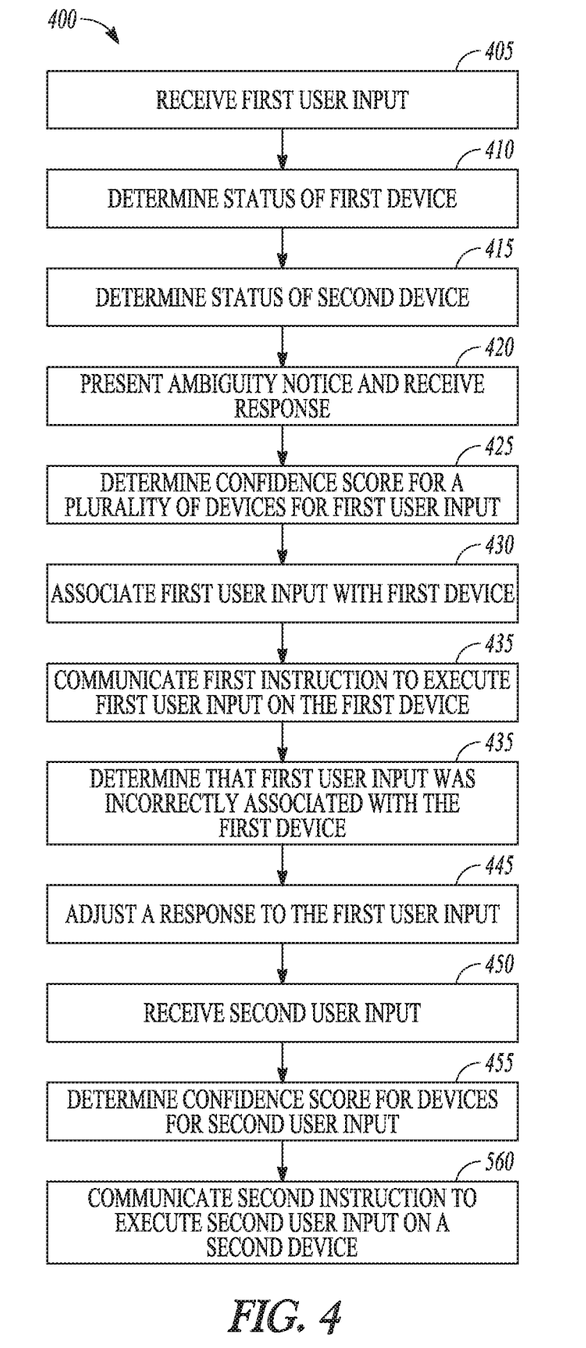
FIG. 4 is a flowchart illustrating a method 400 of associating a first user input with a first device according to an example embodiment.
Figure 5:
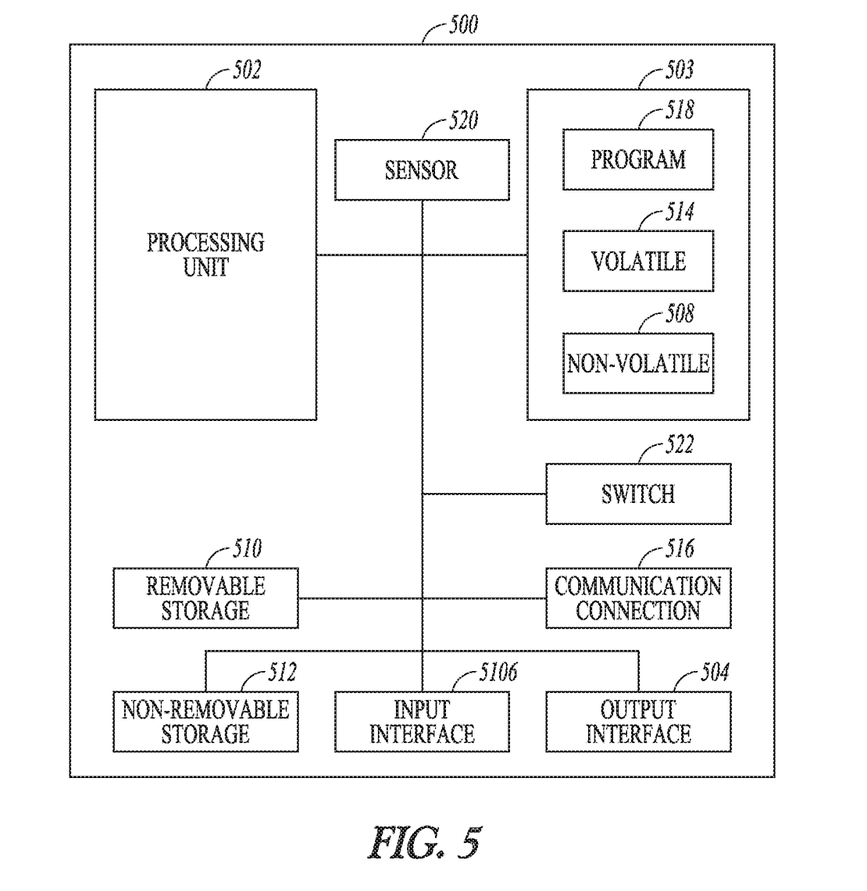
FIG. 5 is a block diagram of computer system used to implement methods according to an example embodiment.

Any of the techniques and methods described above may be combined with the system shown in FIG. 1 or with any of the methods illustrated in FIGS. 2-4, and implemented using the computer system illustrated in FIG. 5.

FIG. 1 is a block diagram of a system for associating user input with a device according to an example embodiment. A first device 110 and second device 115 may be operating in an environment 100. The environment may optionally also include a third device 120 and a fourth device 125. In an internet of things environment, there may be hundreds to thousands or more devices communicating and responding to commands in further embodiments. Devices responding to commands not intended for such devices can be problematic. The environment may also include a hub 130. One or more of the devices or the hub may include one or more sensors such as a microphone, a camera, or a motion sensor, as well as switches that detect state information, such as door open, door closed, on/off states, or other operational states. The hub 130 or one or more of the devices may also gather information from other sensors in the environment (not shown), such as one or more cameras or microphones that are not directly coupled to one of the devices 110, 115, 120, 125. The devices may communicate with each other or with the hub using WiFi, Bluetooth, Zigbee, light, infrared, or other wireless communication techniques. In various examples, rules or algorithms or lookup tables for determining associations may be stored in the hub 130, or in one or more of the devices 110, 115, 120, 125 in the system (e.g. so each device can determine associations on a local processor), or each device may store information relevant to its own operation (e.g. weighting, priority assignments, or tables of relevant vocabulary and responsive actions.) In some examples, responsive to a new device being added to a system, or an existing device being upgraded to include sensors or communication or processing capability to make it a "smart" device, the hub 130 or one of the other devices 110, 115, 120, 125 may receive or retrieve information about the new device so that the new device can be accounted for in association determinations.

In an example, the first device 110 may receive input from a user 150. The input may, for example, be a voice command or a gesture. The user input may include an instruction to execute a command, such as start or stop, and may optionally include additional details such as duration (e.g. run the microwave for 30 minutes) or a start or stop time (e.g. start at 9 PM or brew coffee at 6 AM). Because multiple devices are present, it may be unclear which of the devices is the appropriate device to receive and execute some instructions (e.g. "start"). Such a situation may occur in response to a voice command that does not explicitly identify a device for which the command is intended, such as for example a voice command that simply indicates "start," or "stop."

The first device 110 may process the input to ascertain whether the first device 110 should act in response to the input. The second device 115 may also receive the input. The first device 110 may determine that it is likely (e.g. exceeds an association criteria threshold) the appropriate device to respond to the user input and inform the second device 115 and other devices if they are present, that the user input has been claimed by the first device. In another example, the first device 110 may inform the hub 130, which communicates information about the user input (e.g., do not execute the first input) to the other devices. In another example, the hub 130 may process the user input, determine which device should respond, and notify that device that it should respond. The hub 130 may optionally also notify the other devices that they should not respond to the input.

In various examples, input from a user 150 may be processed by one or more of the devices, may be processed by the devices working together, may be processed by the hub 130, or may be processed by the hub in combination with one or more devices, to determine which device is the appropriate recipient of the user input, i.e. which device should respond. To resolve which device is the appropriate recipient of the user input, a processor may receive and use sensed information from one or more devices such as proximity of the user to a particular device (e.g. the user is near the first device 110), a direction that a user is looking (e.g. the user is facing the first device 110), a direction that a user is speaking, a recent physical interaction with a device (e.g. the dishwasher door was closed prior to receipt of a "start" command, or the microwave door was closed within a specified elapsed time (e.g. 10 seconds) of receipt of a user input, a sequence of device interactions (e.g. a microwave door was opened, and then closed, and then a potentially-relevant user input was delivered), a condition precedent for a command to be relevant (e.g. an object [e.g., hand] present under a smart faucet), or any combination thereof.

The direction that a user is looking may be determined using information gathered by a camera that is processed to assess direction of gaze. Information from multiple microphones may be processed to determine location or direction that speaking user is facing by comparing volume and time of receipt of sound information (with further-away devices receiving audio input later, which may enable determination of relative position or triangulation of user position). In some examples, the hub or one or more of the devices may be informed of the relative position of the devices by a user, or the hub or devices may determine the relative position of the devices using triangulation techniques and sound or wireless signal (e.g. RF) information.

In a situation where the appropriate device recipient for user input is ambiguous or indeterminate, one or more of the devices, or the hub, may produce an indication, such as a sound or light, to indicate that the user input was not resolved.

In one example, a subset of devices that are determined to be potentially appropriate recipients may produce an indication to solicit further information from the user. For example, a microwave or dishwasher or both may both present a light or illuminate a button, prompting the user to press a button or provide another voice command or gesture.

In some examples, a device that is associated with a user input may present a response to notify the user that it received the input, e.g. the device may emit a sound or turn on or flash a light.

In various examples, any of the methods illustrated in FIGS. 2-4 and described below can be performed in the context of the devices and system described above and illustrated in FIG. 1. The methods, for example, may resolve which device should be associated with a user command or other input when the user input is ambiguous or unclear about which device is the intended recipient of the user. In response to resolving the intended recipient, the user input may be routed to the recipient device, or a command to execute the user input may be routed to the device. In other words, in contrast to electronic instructions which typically include a header or other information that specifies the intended recipient device, the recipient device may be responsive to the first user input and contextual information (e.g. user location or prior user interactions), without explicit identification the first device or address of the first device.

FIG. 2 is a flowchart illustrating a method 200 of associating user input with a device according to an example embodiment. At 210, the status of a first device may be determined. The device status may include, for example, an operational state, e.g., on or off, one or more recent interactions (e.g. a door was recently opened and closed), or the proximity of a user (e.g. a user is near the dishwasher) or orientation of a user (e.g. a user is facing the microwave, suggesting that input might be intended for the microwave.) Input may be received from a user at 220. The input may, for example, be audio input such as a voice input that may be processed by voice recognition technology, or a gesture such as a hand movement that may be detected by a camera or motion sensor.

At 230, the user input may be associated with the first device. The user input may, for example, be associated with the first device based on proximity of the user to a device as determined, for example, by one or more sensors, which may be part of the first device, coupled to a hub, or remote sensors (e.g. a wireless camera or speaker or other sensor). In another example, the user input may be associated with the device based upon a recent user interaction with the device. In an example, an elapsed time between the occurrence of the interaction with the first device and receipt of the first input may be determined, and the first user input may be associated with the first device when the elapsed time is below a threshold. In other examples, the user input may be associated with the first device based on a direction that a user is looking, a direction that a user is speaking, a recent interaction with a device, a sequence of device interactions, or a condition precedent for a command to be relevant, or combinations thereof. By using contextual information such as user location or device interactions, the input may be associated with the first device despite the user input lacking information about the intended recipient of the device. In some examples, the status of a second device may be determined, and the second device status may be used to associate the first user input with the first device. For example, responsive to a second device being off, a command to "turn off" may be determined as likely not relevant to the second device.

In some examples, confidence thresholds may be applied to devices, user inputs, or both, e.g. a user input may be associated with a microwave if a confidence threshold of 60% is achieved and may be applied to a stove if a confidence threshold of 80% is achieved. In some examples, a weighting factor for particular inputs may be applied, e.g. a recent interaction may be weighted more highly than a user gaze. In some examples, a device priority may be applied to bias all user inputs or certain user inputs toward a specific device (e.g. "turn off" may be biased toward a stove or oven and away from a dishwasher). In some examples, certain devices may requires a higher level of confidence prior to association of a command with the device. In some examples, certain commands may require a higher confidence threshold, e.g. "hotter" maybe require a relatively high threshold for control of a faucet, but "turn off" may have a relatively low threshold for a toaster due to the relatively low impact from a misdirected command. In various examples, any combination of these pieces of information may be combined to deter whether user input should be associated with the first device.

Responsive to associating a user input with a device, the input may be routed to the identified recipient device or an instruction to execute the input on the first device may be optionally communicated to the first device. In an example, the instruction may be communicated from a processor in or coupled to the first device to a controller that may actuate a response to the user input, such as starting a microwave or dishwasher. In another example, the instruction may be communicated from a hub or other device to the first device, for example using wireless or wired communication techniques.

FIG. 3 is a flowchart illustrating a method 300 of associating user input with a device based on a confidence score according to an example embodiment. User input is received at 310, such as audio input, which may be received through a microphone and optionally may be processed by voice recognition technology, or a gesture such as a hand movement that may be detected by a camera or motion sensor. To determine which device of a group of devices to associate with the user input, at 320 a confidence score may be determined for each of plurality of devices. As described in detail above, the confidence score may be determined from the user input and from contextual information such as device status. Device status may include present or recent interactions with a device. For example, a previously-detected interaction with a device in the system may retrieved from memory the device, a hub, or a master device and referenced by an algorithm that computed confidence scores. The device interaction may, for example, include opening or shutting a door, or actuating a switch or button.

At 330, the user input may be associated with the first device at 330. The user input may, for example, be associated with the first device 330 based on the timing or nature of the interaction with the first device. The user input may also be associated with the first device based on proximity of the user to one or more sensors, a direction that a user is looking, a direction that a user is speaking, a recent interaction with a device, a sequence of device interactions, or a condition precedent for a command to be relevant. In various examples, any combination of these pieces of information may be combined to determine whether user input should be associated with the first device.

At 340, an instruction to execute the input on the first device may be optionally communicated to the first device. In an example, the instruction may be communicated from a processor in or coupled to the first device to a controller that may actuate a response to the user input. In another example, the instruction may be communicated (e.g., routed) from a hub or other device to the first device, for example using wireless or wired communication techniques.

FIG. 4 is a flowchart illustrating a method 400 of associating a first user input with a first device according to an example embodiment. At 405, user input may be received. The input may, for example include an audio input, which may be received through a microphone and optionally may be processed by voice recognition technology, or a gesture such as a hand movement that may be detected by a camera or motion sensor, or a combination of input formats (e.g. gesture and sound.) At 410, a status of a first device may be determined. At 415, a status of a second device may be determined. The device status determined at 410 or 415 may include a previously or presently detected interaction with a device. The detected interaction may, for example, include detection of opening or shutting a door, or actuation of a switch or button. At 420, an ambiguity notice may be optionally presented and a response may be optionally received. The ambiguity notice may, for example, be presented in response to a determination that a user input cannot with sufficient confidence be associated with a specific device (e.g. the first device or second device.) At 425, a confidence score may be determined or a plurality of devices. As described in detail above, the confidence scores may, for example, be based on the timing or nature of the interaction with the first device, a proximity of the user to one or more sensors, a direction that a user is looking, a direction that a user is speaking, a recent interaction with a device, a sequence of device interactions, a condition precedent for a command to be relevant, or disambiguation information received in response to an ambiguity notice. In various examples, any combination of these pieces of information may be combined to deter whether user input should be associated with the first device. At 430, the first user input may be associated with the first device responsive to the first device having a higher confidence score than the other devices. At 435, an instruction may be communicated to the first device to execute the first user input. In an example, the instruction may be communicated from a processor in or coupled to the first device to a controller that may actuate a response to the user input, such as starting a microwave or dishwasher. In another example, the instruction may be communicated from a hub or other device to the first device, for example using wireless or wired communication techniques. In addition, responsive to a determination that a user input is relevant to a first device, an instruction not to execute an action in response to the issuer input may be communicated to the second device.

At 440, it may be determined that the user input was incorrectly associated with a first device. It may be determined, that the user input should have been associated with a second device. This may be determined, for example, based upon a subsequent user interaction with the second device (e.g. pressing a start button on a dishwasher after a command was incorrectly associated with a microwave), or based upon a second user input received after the first user input (e.g. "start" followed by "start the dishwasher" or "not the microwave" or "stop the microwave").

At 445, a response to the first input may be adjusted. In other words, the method may be adaptive, e.g. it may change one or more association parameters in response to a determination that a user input was incorrectly associated with a device. In an example, a required confidence threshold for a particular user input may be adjusted, or weighting associated with a user input may be adjusted (e.g. "start now" weighted to more heavily be associated with a dishwasher than a microwave").

At 450, a second user input may be received. At 455, a confidence score may be determined for the plurality of devices based on the second user input and contextual information such as device status. At 455, a confidence score may be determined for the second user input for each of the plurality of devices. The confidence score may reflect the adjustment made in response to determining that the first user input was incorrectly associated with the first device. Responsive to a confidence score for a second device being higher than the scores for the other devices, the second user input may be associated with a second device. At 460, a communication may be sent (e.g., routed) to a second device to execute the second user input based on an association of the second user input with the second device.

FIG. 5 is a block schematic diagram of a computer system 500 to implement device 100 and other computing resources according to example embodiments. All components need not be used in various embodiments. With reference to the devices shown in FIG. 1, the first device 110, second device, 115, third device 120, fourth device 125, and hub 130 may be constructed according to the implementation shown in FIG. 5. One example computing device in the form of a computer 500, may include a processing unit 502, memory 503, removable storage 510, and non-removable storage 512. One or more sensor 520 may be coupled to provide data to the processing unit 502. Sensors may include, for example, a microphone, a camera, or a motion sensor. Switches 522 may also be coupled to provide data to the processing unit 502. Sensors may, for example, detect state information, such as door open, door closed, on/off states, or other operational states. Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 500 may include or have access to a computing environment that includes input 506, output 504, and a communication connection 516. The input may, for example, include buttons, or a microphone to receive user voice input, or a camera or motion sensor to detect gestures or motion or proximity, or any combination of buttons, microphone, or sensors. Output 504 may include a display device, such as a touchscreen, that also may serve as an input device. Output 504 may also include a speaker or light or both. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 500. A hard drive, CD-ROM, DRAM, and RAM are some examples of devices including a non-transitory computer-readable medium. For example, a computer program 518 may be used to cause processing unit 502 to perform one or more methods or algorithms described herein, such as processing user input, for example using voice recognition techniques, processing device interactions such as switch activation or proximity or user direction (e.g. gaze or sound direction), or determining an association between user input and a device based on the user input, proximity, direction, device interaction or the other information sources described in the methods described herein. Computer program 518 may be stored on a device or may be downloaded from a server to a device over a network such as the Internet. Computer-readable instructions may also be included on a computer readable storage medium that is being vended and/or provided, where the computer readable storage medium is defined as not encompassing a transitory signal, carrier wave, and/or a signal per se.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
   determining a status of a first device;
   receiving a first user input representative of a command to control one of multiple devices wherein the multiple devices include the first device, wherein the first user input does not explicitly identify which of the multiple devices the command is intended to control;
   determining whether the first device of the multiple devices is an intended recipient of the first user input based at least in part on the status of the first device and the first user input;
   responsive to a determination that the first device is the intended recipient of the first user input, associating the first user input with the first device; and
   communicating a second instruction to a second device of the multiple devices, the second instruction informing a second device not to respond to the first user input.

2. The method of claim 1, wherein determining the status of the first device further includes detecting an interaction with the first device, and wherein the command comprises a user spoken command.

3. The method of claim 2, wherein detecting the interaction with the first device includes detecting a physical interaction with the first device.

4. The method of claim 2, wherein associating the first user input with the first device includes determining an elapsed time between occurrence of the interaction with the first device and receipt of the first user input and associating the first user input with the first device when the elapsed time is below a threshold.

5. The method of claim 1, further comprising determining a status of a second device of the multiple devices, wherein the first user input, the status of the first device, and the status of the second device is used to associate the first user input with the first device.

6. The method of claim 1, further comprising presenting an ambiguity notice and receiving a response to the ambiguity notice, wherein associating the first user input with the first device includes processing the response to the ambiguity notice.

7. The method of claim 1, wherein associating the first user input with the first device includes determining a confidence score for the first device associating the first user input with the first device responsive to the confidence score for the first device exceeding an association criteria threshold.

8. The method of claim 1, wherein associating the first user input with the first device includes determining confidence scores for a plurality of the multiple devices, the plurality of devices including the first device, and associating the first user input with the first device when the first device is determined to have the highest confidence score.

9. The method of claim 1, further comprising:
   detecting an interaction with a second device of the multiple devices;
   associating a second user input with the second device based upon the detected interaction with the second device, wherein the second user input and the interaction with the second device is used to associate the second user input with the second device; and
   communicating a second instruction to execute the second user input on the second device.

10. A computing device comprising:
    a processor; and
    a memory device coupled to the processor having instructions stored thereon executable by the processor to:
    determine a status of a first device;
    receive a first user input representative of a command to control one of multiple devices wherein the multiple devices include the first device, wherein the first user input does not explicit identify which of the multiple devices the command is intended to control;
    determine whether the first device of the multiple devices is an intended recipient of the first user input based at least in part on the status of the first device and the first user input;

responsive to a determination that the first device is the intended recipient of the first user input, associate the first user input with the first device; and communicate a second instruction to a second device of the multiple devices, the second instruction informing a second device not to respond to the first user input.

11. The computing device of claim 10, wherein the memory device has instructions stored thereon executable by the processor further to determine a status of a second device of the multiple devices, wherein the first user input, the status of the first device, and the status of the second device is used to associate the first user input with the first device.

12. The computing device of claim 10, wherein the memory device further has instructions stored thereon executable by the processor to determine confidence scores for a plurality of the multiple devices, the plurality of devices including the first device, and associate the first user input with the first device when the first device is determined to have the highest confidence score.

13. The computing device of claim 10, wherein the memory device further has instructions stored thereon executable by the processor to:
    detect an interaction with a second device of the multiple devices;
    associate a second user input with the second device based upon the detected interaction with the second device, wherein the second user input and the interaction with the second device is used to associate the second user input with the second device;
    communicate a second instruction to execute the second user input on the second device.

14. The computing device of claim 13, further comprising a communication interface, wherein the memory device further has instructions stored thereon executable by the processor to control the communication interface to wirelessly notify the first device of the first user input and wirelessly notify the second device of the second user input.

15. The computing device of claim 10, wherein the processor is coupled to the first device.

16. A machine readable storage device, that is not a transitory signal, having instructions that are executable by a processor to perform operations comprising:
    determining a status of a first device;
    receiving a first user input representative of a command to control one of multiple devices wherein the multiple devices include the first device, wherein the first user input does not explicitly identify which of the multiple devices the command is intended to control;
    determining whether the first device of the multiple devices is the intended recipient of the first user input based at least in part on the status of the first device and the first user input;
    responsive to a determination that the first device is the intended recipient of the first user input, associating the first user input with the first device;
    communicating a second instruction to a second device of the multiple devices, the second instruction informing a second device not to respond to the first user input.

17. The machine readable storage device of claim 16, further having instructions that are executable by a processor to perform:
    determining a status of a second device of the multiple devices, wherein the first user input, the status of the first device, and the status of the second device is used to associate the first user input with the first device.

18. The machine readable storage device of claim 17, wherein associating the first user input with the first device includes determining confidence scores for a plurality of the multiple devices, the plurality of devices including the first device, and associating the first user input with the first device when the first device is determined to have the highest confidence score.

* * * * *